(12) United States Patent
Takeuchi et al.

(10) Patent No.: US 7,458,633 B2
(45) Date of Patent: Dec. 2, 2008

(54) CRAWLER FRAME MOUNTING STRUCTURE FOR CONSTRUCTION MACHINERY

(75) Inventors: Masaji Takeuchi, Hirakata (JP); Tadashi Ekawa, Hirakata (JP)

(73) Assignee: Komatsu Ltd., Tokyo (JP)

( * ) Notice: Subject to any disclaimer, the term of this patent is extended or adjusted under 35 U.S.C. 154(b) by 98 days.

(21) Appl. No.: 11/660,736

(22) PCT Filed: Aug. 29, 2005

(86) PCT No.: PCT/JP2005/015669

§ 371 (c)(1),
(2), (4) Date: Feb. 22, 2007

(87) PCT Pub. No.: WO2006/030626

PCT Pub. Date: Mar. 23, 2006

(65) Prior Publication Data

US 2007/0290526 A1    Dec. 20, 2007

(30) Foreign Application Priority Data

Sep. 14, 2004    (JP)    ............................... 2004-266209

(51) Int. Cl.
*B62D 21/10* (2006.01)

(52) U.S. Cl. ..................................... 296/204

(58) Field of Classification Search ................. 296/204; 180/311; 212/175; 37/379
See application file for complete search history.

(56) References Cited

U.S. PATENT DOCUMENTS

| | | | | | |
|---|---|---|---|---|---|
| 1,629,890 | A | * | 5/1927 | Ronk | 280/781 |
| 2,144,760 | A | * | 1/1939 | Harnischfeger | 212/253 |
| 4,341,276 | A | * | 7/1982 | Furuichi | 180/9.48 |
| 4,391,341 | A | * | 7/1983 | Taghon | 180/9.1 |
| 4,397,481 | A | * | 8/1983 | Dion et al. | 280/781 |
| 5,823,279 | A | * | 10/1998 | Petzold | 180/9.1 |
| 6,848,522 | B2 | * | 2/2005 | Moore et al. | 180/9.1 |

FOREIGN PATENT DOCUMENTS

| | | | |
|---|---|---|---|
| JP | 55-160988 U | | 11/1980 |
| JP | 02-86883 U | | 7/1990 |
| JP | 08216940 A | * | 8/1996 |
| JP | 09-136662 A | | 5/1997 |
| JP | 2002-275939 A | | 9/2002 |

* cited by examiner

*Primary Examiner*—H Gutman
(74) *Attorney, Agent, or Firm*—Global IP Counselors, LLP

(57) ABSTRACT

A mounting structure for a center frame and crawler frames of a base carrier of a construction machine, which can increase durability without complicating the structure is provided. A crawler frame mounting structure for a construction machine includes a center frame configured to rotatably support an upper rotating body, fastening portions for fastening the center frame to crawler frames on right and left sides by front and rear leg portions, and end plates having widths wider than the width between attachment positions of a pair of vertical plates. The end plates including tie bolt holes formed on both right and left ends are welded.

12 Claims, 7 Drawing Sheets

CRAWLER FRAME MOUNTING STRUCTURE FOR CONSTRUCTION MACHINERY

CROSS-REFERENCE TO RELATED APPLICATIONS

This U.S. National stage application claims priority under 35 U.S.C. §119(a) to Japanese Patent Application No. 2004-266209, filed in Japan on Sep. 14, 2004, the entire contents of which are hereby incorporated herein by reference.

TECHNICAL FIELD

The present invention relates to a crawler frame mounting structure for a construction machine of a type running by crawler tracks such as hydraulic shovels, crawler cranes, and the like.

BACKGROUND ART

Construction machine, typically, a hydraulic shovel includes a base carrier formed of a center frame which serves as a base, crawler frames, crawler tracks provided on the crawler frames, and a drive mechanism therefor. In general, the center frame and the crawler frames are assembled by bolting leg portions protruding from both sides of the center frame to an upper surface of the crawler frames. Such a structure allows the machinery to be dismantled for transportation.

FIG. 6 shows a specific example of a joint portion between leg portions 51 of a center frame 50 and a crawler frame 55. In this exemplary connection, mounting seat portions 52 protrude from both sides of the leg portions 51 having box constructions and mounting seats 56 provided on an upper surface of the crawler frame 55. The mounting seat portions 52 and mounting seats 56 overlap each other and are fastened by a number of mounting bolts. To tips of the leg portions 51 of the center frame 50, plates 53 are welded so as to close an opening of the box constructions in order to prevent sand from entering the leg portions 51 while the machinery is running on the site. A portion connected in this way can be easily damaged due to an influence of an external force which may be applied by a movement of the device while it is working. Thus, in order to reinforce the joint portions, Japanese Laid-Open Publication No. 9-136662proposes a joint structure in which members with a number of mounting bolt holes are provided on a series of block members for bolt fastening.

However, in the structure shown in FIG. 6, when the machinery goes over bumps while it is working or running on a sloping land, a force in a helical direction is applied to the crawler frame. A large external force is applied to the tip portions of the leg portions in welded portions between upper members 51a, vertical members 51b and lower members 51c of the leg portions 51 which are formed into a box construction, and damage may be caused. Since the plates 53 attached to the tips of the leg portions 51 are strength members, a high stress is applied to the welded portions and the base material of the plate 53. This causes a problem that, due to an influence from the plates 53 attached to the tips, a crack is easily generated around side portions.

The reinforcing means known from Japanese Laid-Open Publication No. 9-136662 has been proposed in order to replace conventional reinforcing ribs (gussets) which connect vertical members forming protruding leg portions of the center frame and lower members which serve as mounting seats because such conventional ribs can easily be damaged due to concentration of a stress. This problem is solved by the proposed means. However, the method may cause another problem. In this method, tie bolts between the leg portions and a track frame (crawler frame) are bolted through mounting holes provided on one long block member used along the joint portion between the vertical plates of the leg portions and protruding portions of the leg portions (mounting plate). Thus, without sufficient control on fastening strengths of bolts, even when there is insufficiency in a fastening force for some of a plurality of bolts, this may be overlooked, and damage of a tie bolt or a crack in a welded portion near a protruding portion of a leg portion may occur.

SUMMARY OF THE INVENTION

The present invention is to solve the above-described problems, and an object thereof is to provide a crawler frame mounting structure for a construction machine which can improve durability without complicating the structure.

For achieving the above-mentioned object, the crawler frame mounting structure for a construction machine according to the present invention has following features.

A crawler frame mounting structure for a construction machine of a first aspect of the present invention includes a center frame and plates. The center frame has a revolving upper machinery which is rotatably attached thereto, and leg portions on both a right end and a left end, and is fastened to crawler frames at the leg portions. The leg portions form box constructions by having base plate members, a pair of vertical plate member standing on the base plate members with a predetermined space being interposed therebetween and upper plate members attached so as to cover upper portions of the pair of vertical plate members welded to each other. Plates are fixed to tips of the leg portions by welding, and fixed to the crawler frames by tie bolts inserted into tie bolt holes formed on both right and left ends.

With such a structure, the plates plays not only a role of closing ends of the box constructions formed at the leg portions but also a role of firmly fixing the tip portions of the leg portions where a stress tend to concentrates the most with the tie bolts. In this way, durability against a stress to be applied to the welded portions of the leg portions and the like which may be generated due to a twist of the crawler frames or the like can be improved.

The crawler frame mounting structure for a construction machine of a second aspect of the present invention is a crawler frame mounting structure for a construction machine of the first aspect of the present invention in which the plates have widths wider than a space between welded positions to the pair of vertical plate members forming the leg portions.

With such a structure, proof strength of the plates themselves can be improved compared to that when plates having the widths about the same as the space between the welded positions to the vertical plate members are attached. Thus, the durability against the stress to be applied to the welded portions of the leg portions and the like which may be generated due to a twist of the crawler frames or the like can be further improved.

The crawler frame mounting structure for a construction machine of a third aspect of the present invention is a crawler frame mounting structure for a construction machine of the first or second aspect of the present invention in which the tie bolts holes formed on the both ends of the plates are formed outside welded positions to the pair of vertical plate members forming the leg portions.

With such a structure, the plates to be attached to the tips of the leg portions can be fixed substantially along the same line as a plurality of tie bolts by which the base plate members are attached to the crawler frames, and, consequently, the widths of the plates become wider than the space between the welded positions to the vertical plate members. Thus, the durability against the stress to be applied to the welded portions of the leg portions and the like which may be generated due to a twist of the crawler frames or the like can be improved more efficiently.

The crawler frame mounting structure for a construction machine of a fourth aspect of the present invention is a crawler frame mounting structure for a construction machine of one of the first through third aspect of the present invention in which the plates are fixed to the crawler frames by the tie bolts with the base plate members which form the leg portions being interposed therebetween.

With such a structure, compared to the case where the plates are directly fixed to the crawler frames without interposing the base plate members forming the box constructions of the leg portions, a stress to be applied to the leg portions due to a twist of the crawler frames or the like can be prevented from dispersing among the portions of the box constructions of the leg portions and the plate portions, and the stress can be received at only the box constructions of the leg portions. Thus, it becomes possible to prevent a crack between the box constructions of the leg portions and the plate portions attached the tip thereto and to obtain a structure with high durability.

The crawler frame mounting structure for a construction machine of a fifth aspect of the present invention is a crawler frame mounting structure for a construction machine of one of the first through fourth aspects of the present invention in which substantially R-shaped portions are formed on the both ends of the plates.

With such a structure, concentration of a stress at both ends of the plates can be avoided with recessed parts of the substantially R-shaped portions, and durability can be improved.

The crawler frame mounting structure for a construction machine of a sixth aspect of the present invention is the crawler frame mounting structure for a construction machine of one of the first through fifth aspects of the present invention in which the leg portions are attached to spaces between a plurality of upper roller attached to the crawler frames.

With such a structure, by forming the leg portions having the widths as large as possible within the spaces between the attachment positions of the upper wheels, and fixing the leg portions to those positions, the center frame can be firmly fixed to the crawler frames.

As described above, not only the widths of the leg portions, but also the widths of the plates are secured to be as wide as possible within the spaces between the attachment positions of the upper wheels, so that the structure with higher durability can be formed.

The crawler frame mounting structure for a construction machine of a seventh aspect of the present invention includes a center frame to which a revolving upper machinery is rotatably attached, fastening portions for fastening the center frame to crawler frames on right and left sides respectively by front and rear leg portions, and plates which are welded to tips of the leg portions, formed to have widths wider than a width between attachment positions of a pair of vertical plates forming the leg portions, and provided with tie bolt holes formed on both right and left ends.

According to the present invention, the plates attached to the tips of the leg portions not only close the end faces of the box constructions but also function as strength members. The plates also increase axial forces of the tie bolts at the tips of the leg portions which are affected the most by an external force. In this way, an effect that a stress at welded portions and base materials of the leg portions generated due to a twist of the crawler frames is relaxed and the durability is improved can be achieved.

BRIEF DESCRIPTION OF THE DRAWINGS

FIG. 4($b$) is a view cut along line A-A of FIG. 4($a$).

FIG. 5($b$) is a stress distribution diagram for a center frame leg portion of a conventional structure.

DETAILED DESCRIPTION OF THE INVENTION

Hereinafter, embodiments of the crawler frame mounting structure for a construction machine according to the present invention will be described with reference to the drawings.

Figure 1:
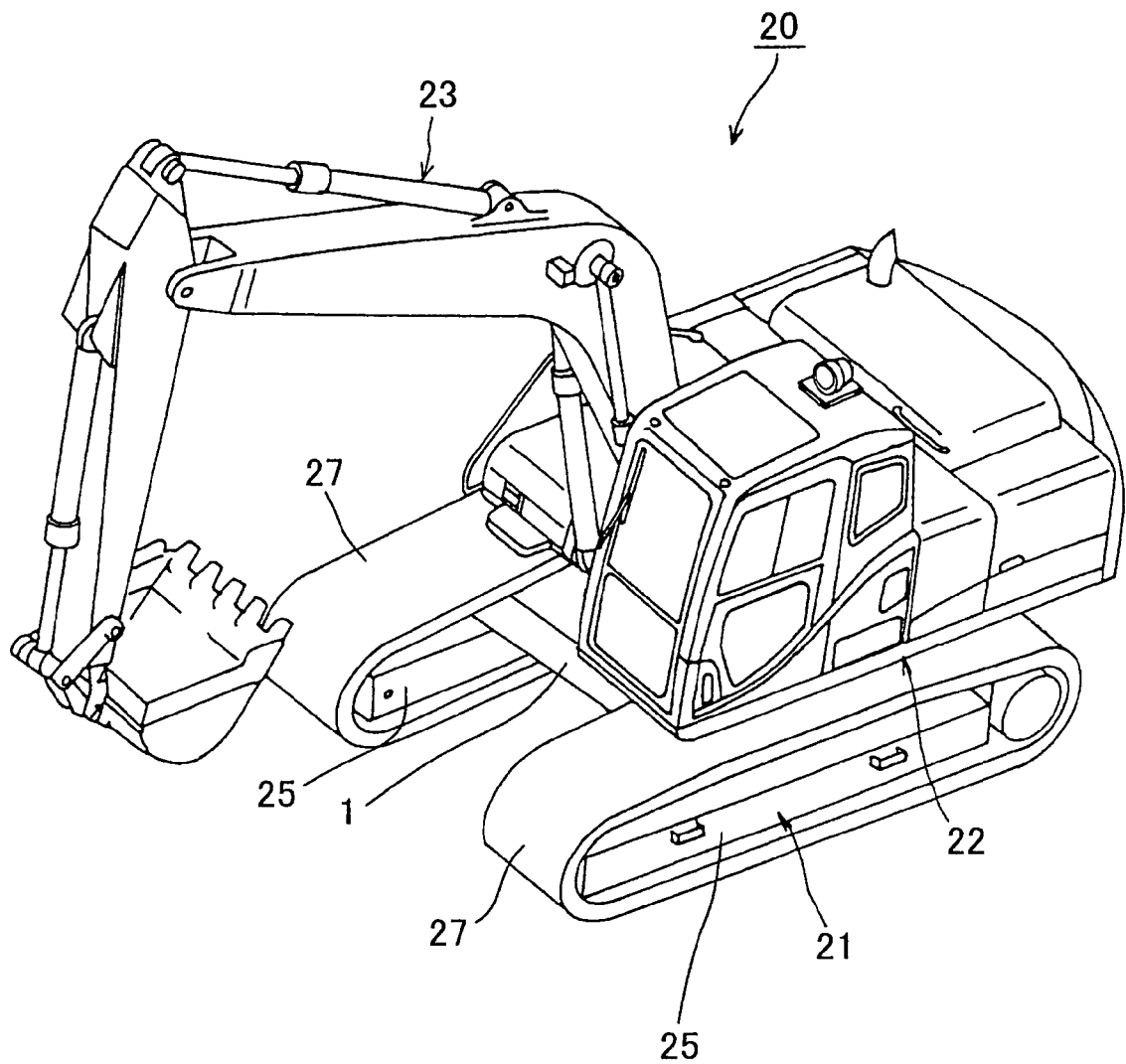
FIG. 1 is an entire perspective view of a hydraulic shovel to which the present invention is applied.
Figure 2:
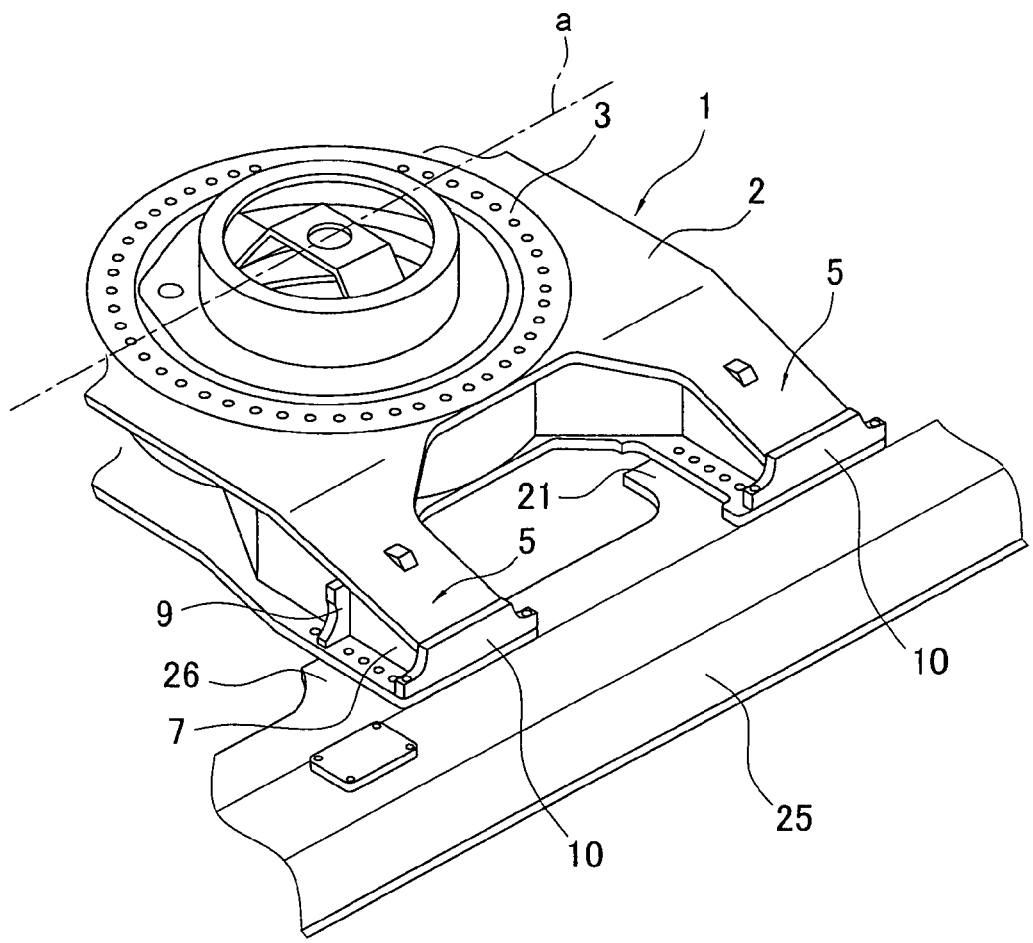
FIG. 2 is a perspective view showing an outline of an important portion.
Figure 3:
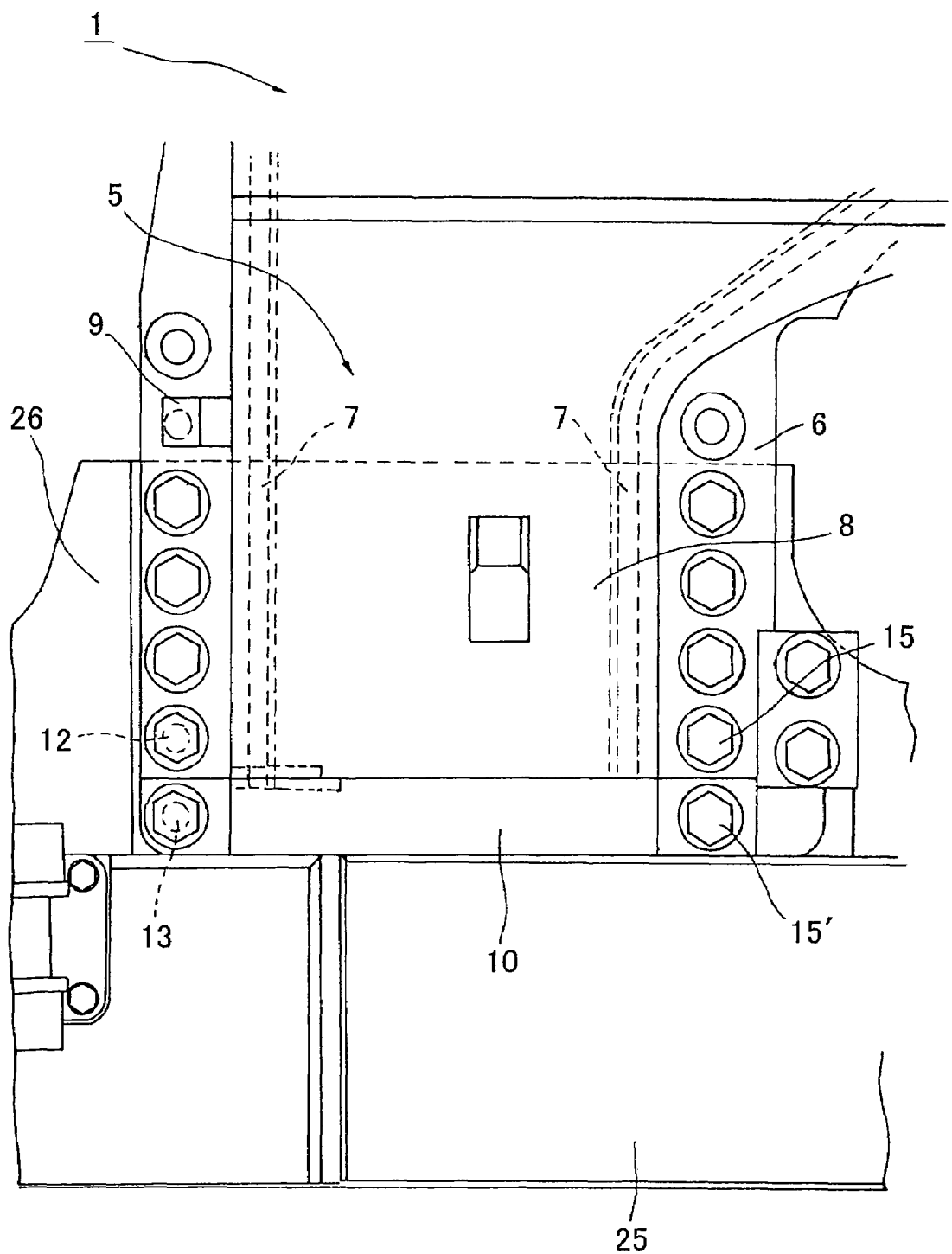
FIG. 3 is an enlarged plan view of the important portion.
Figure 4:
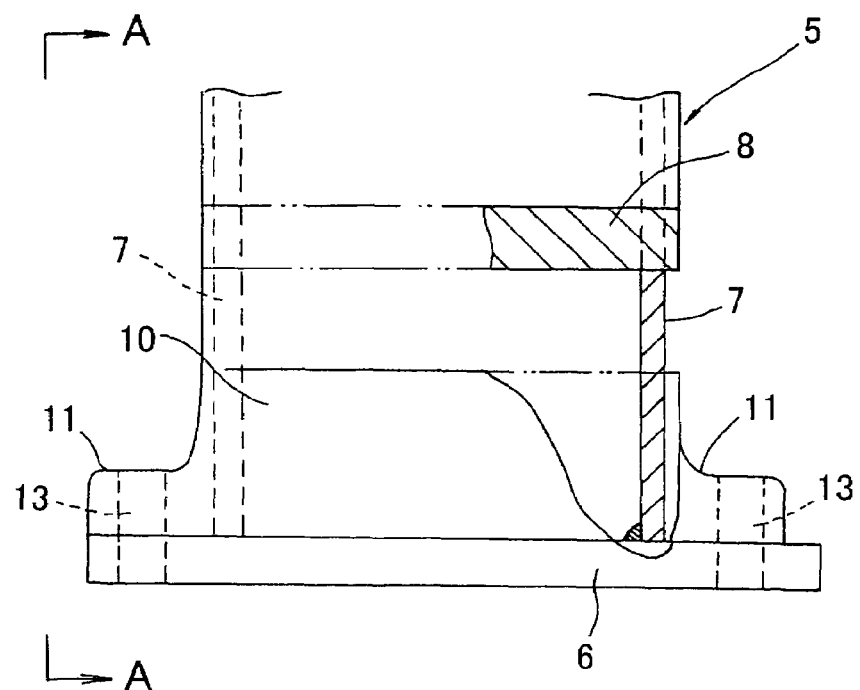
FIG. 4($a$) is a view of a leg portion of a center frame which is partially cut away and viewed from a tip side.
Figure 4:
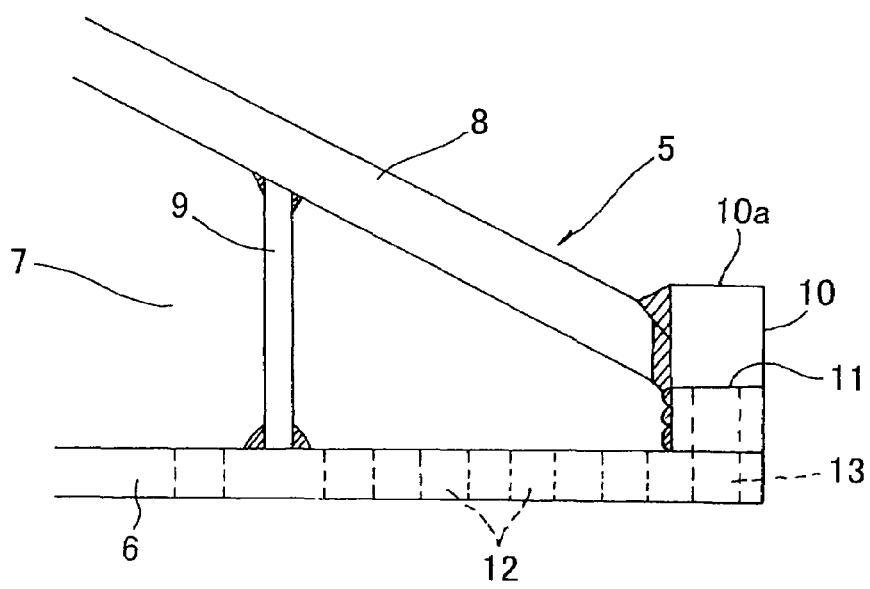

FIG. 1 is an entire perspective view of a hydraulic shovel to which the present invention is applied. FIG. 2 is a perspective view showing an outline of an important portion. FIG. 3 is an enlarged plan view of the important portion. FIG. 4($a$) is a view of a leg portion of a center frame which is partially cut away and viewed from a tip side. FIG. 4($b$) is a cross-sectional view cut along line A-A of FIG. 4($a$).

A base carrier 21 of a hydraulic shovel 20 is formed of a center frame 1 and a pair of crawler frames 25. The center frame 1 rotatably supports an upper rotating body 22 which is provided with an operating machine 23 and a power output section such as engine. Crawler tracks 27 which are driven and run are wound around and supported by the crawler frames 25.

The center frame 1 includes leg portions 5 provided on the right and left sides of a main body portion 2. (Herein, directions are represented with respect to a traveling axis line a. The same is also true of the following descriptions.) On an upper surface of the main body portion 2, a mounting portion 3 for a rotating circle for revolving is provided. On each of the right and the left sides of the main body portion 2, the leg portions 5 protrude respectively at front and rear ends with a predetermined space interposed therebetween. Since the leg portions 5 are provided symmetrically, FIG. 2 shows only one side.

The leg portion 5 (since all the leg portions 5 have the same structure, only one will be described for the sake of explanation) includes a lower member 6, vertical members 7 (corresponding to vertical plate members of the present invention), and an upper member 8 which are integrally jointed by welding and which together form an external shape of a box construction as a whole. The lower member 6 has a predetermined width dimension, and a mounting seat portion to be jointed to a mounting seat 26 of the crawler frame 25 is formed thereon. The vertical members 7 are standing on the lower member 6 with a predetermined space being interposed therebetween. The upper member 8 is provided on the vertical members 7. To a tip of the leg portion 5, a thick end plate 10 is integrally welded so as to block an end surface of the box construction. The end plate 10 includes step portions 11 which include a substantially R-shaped portions formed on both sides. The width of the upper half of the end plate 10 is the same as or slightly wider than the width dimension of the upper member 8 (a gap between welded positions to the pair of vertical members 7) and the width of the lower half is slightly narrower than the width of the lower member 6. On both step portions 11, tie bolt holes 13 are respectively provided so as to penetrate through the lower member 6. The end plate 10 is jointed respectively to the upper member 8, the vertical members 7, and the lower member 6 which form the leg portion 5 by fillet welding. An upper end 10a of the end plate 10 is formed so as to protrude above an upper end surface of the upper member 8 in order to relax a stress at the welded portion and to secure a length of welds.

On an upper surface of the crawler frame 25, the mounting seats 26 for supporting the leg portions 5 of the center frame 1 are provided at two corresponding positions on the front and rear sides. The mounting seats 26 are provided with a necessary number of bolt holes for jointing and fixing the leg portions 5 of the center frame 1 to predetermined positions. The mounting seats 26 are also provided with a supporting portion (not shown) which is for an idle wheel on the front end, and a bracket (not shown) which is for supporting a driving wheel and a driving section therefor on the rear end. Between these two ends, a box construction is provided. Inside the box construction, a device such as a tension adjustment device (not shown) for the crawler tracks 27 to be wound can be incorporated.

The center frame 1 having the above-described structure is fastened and fixed to the crawler frame 25 by bolts 15 and 15' and nuts (not shown) with the mounting seat portions formed of the lower members 6 of the leg portions 5 being placed on the mounting seats 26 of the crawler frame 25, and bolt holes 12 and 13 and the bolt holes (of the mounting seats 26) being aligned to each other. In this way, an entire frame of a base carrier 21 is formed.

In the entire frame of the base carrier 21 having the above-described structure, for the jointed portions between the leg portions 5 and the mounting seats 26 where the crawler frames 25 are jointed to the center frame 1 with an external force being applied, tip portions of the leg portions 5 of the center frame 1 are welded and bonded integrally to thick end plates 10 at end portions of the box constructions formed of the lower members 6, vertical members 7, and upper members 8, and function as strength members. Thus, a stress at the welded portions and base materials in these portions due to an external force can be relaxed. The both sides of end plates 10 at the tip portions of the leg portions 5 also serve as reinforcing ribs (gussets), and function to improve the strength of the leg portions 5 in cooperation with gussets 9 provided on an outer side surface of the leg portions 5 at an intermediate position.

Figure 5:
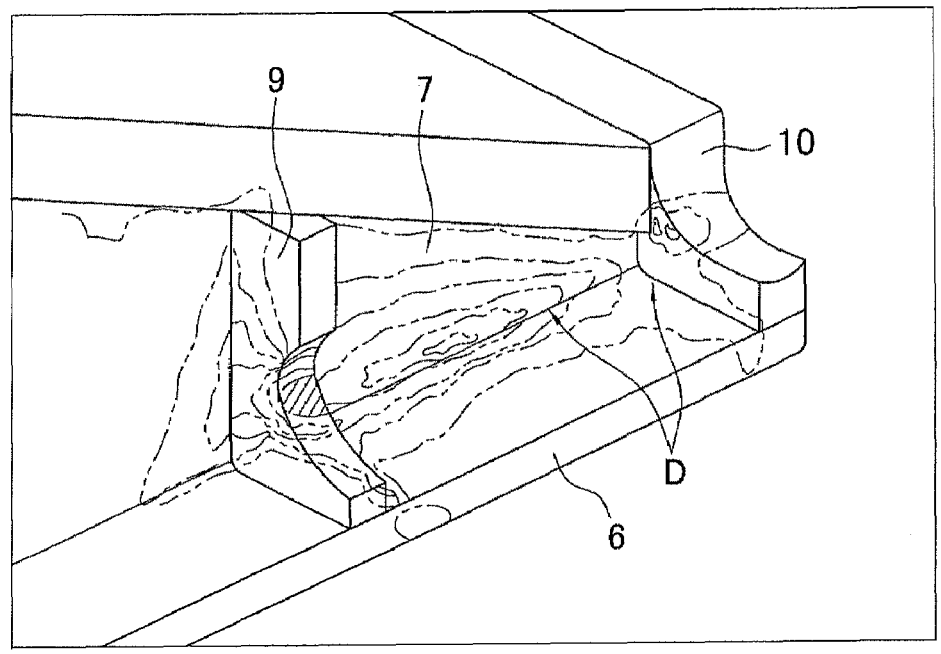
FIG. 5($a$) is a stress distribution for a center frame leg portion of a structure according to the present embodiment.
Figure 5:
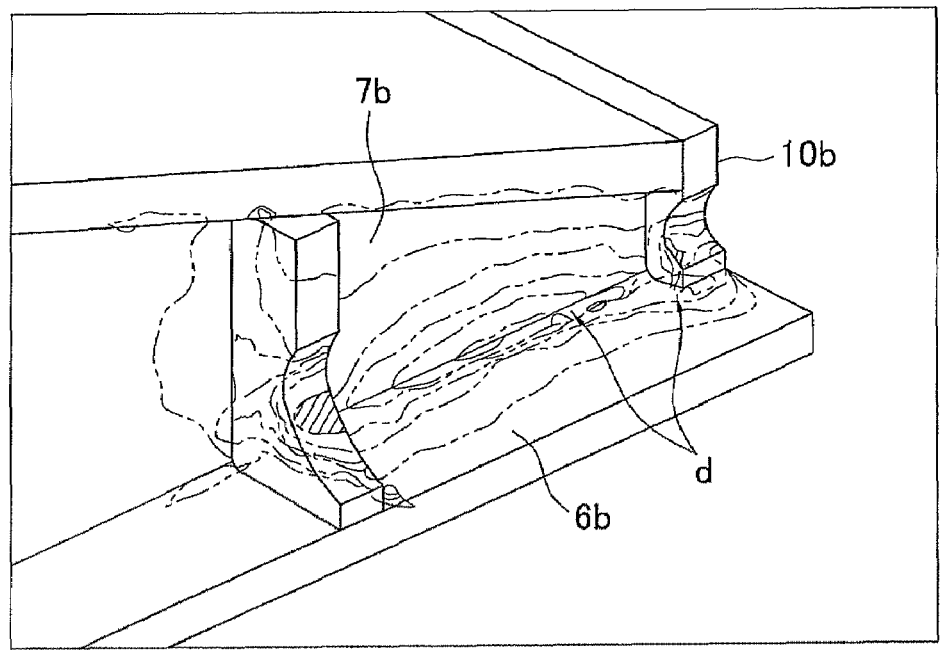
Figure 6:
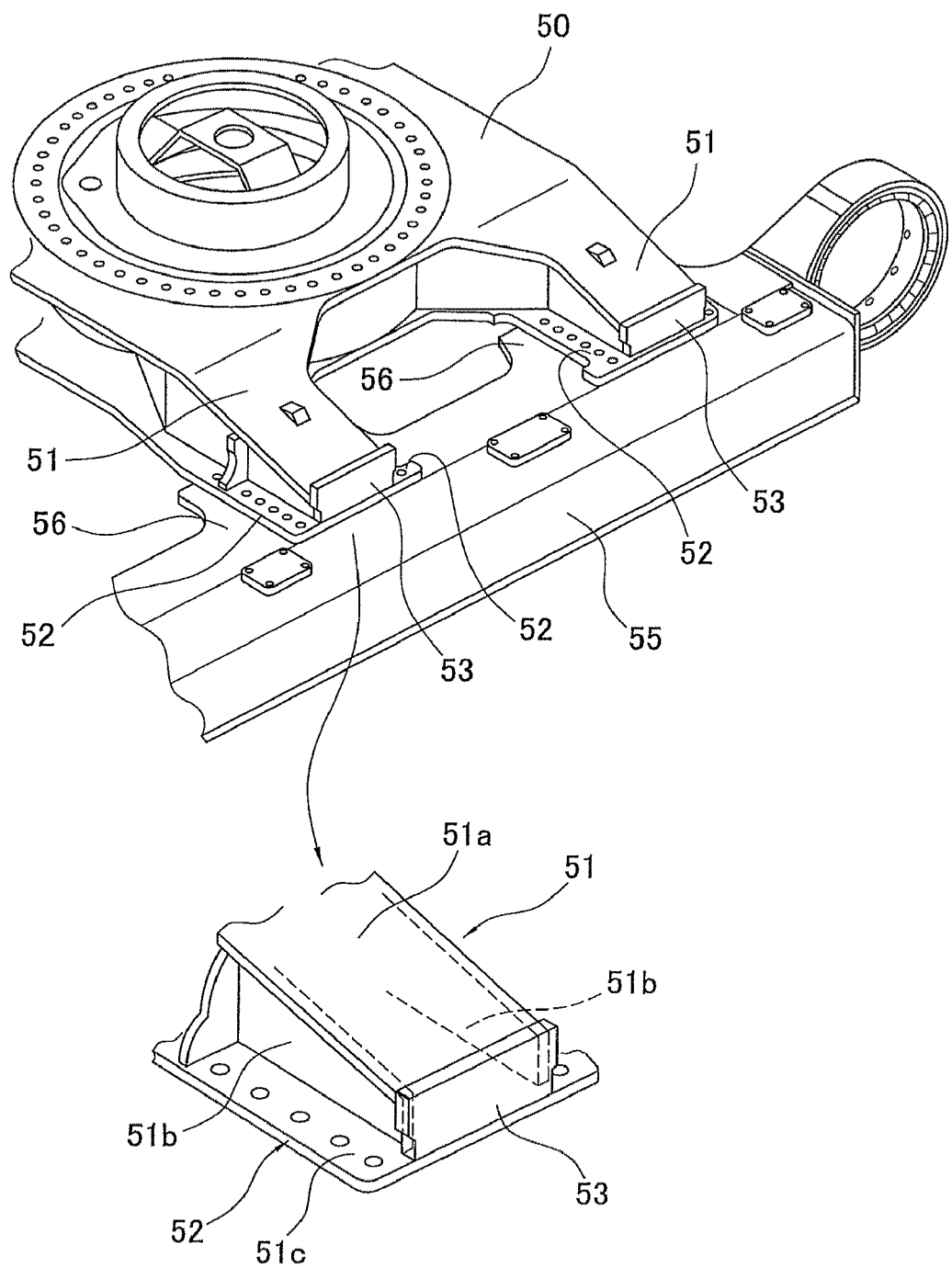
FIG. 6 is a diagram showing an example of a joint portion between a center frame and a crawler frame in a conventional base carrier.

FIG. 5(a) shows a stress distribution diagram illustrating a stress distribution for a leg portion structure of the center frame according to the present embodiment which is obtained by simulation. In this simulation, it can be estimated that a dominant cause for a crack to be generated is a tensile stress. Thus, a torsion moment is applied to the leg portions, and the results are checked. As can be seen from this stress distribution diagram, by welding and attaching the thick end plate 10 to the tip portions of the leg portions 5, a stress at the portions becomes small, and a stress at the welded portions D between the vertical members 7 and the lower member 6 at the rear position and the base materials is relaxed compared to that shown in a stress distribution diagram for a center frame leg portion of a conventional structure under the same conditions of FIG. 5(b). In the conventional structure, the stress distribution is dense across the leg portion tip portions 10b toward welded portions d between the vertical members 7b and the lower member 6b at the rear portion which are linked thereto. It can be seen that the influence of the external force is large.

As a result, problems which may be generated at the fastened portions between the leg portions of the center frame and the crawler frames in the base carrier where a large load is applied for a long period of time due to a harsh operation can be solved. An effect that durability can be increased even with a simple structure can be achieved.

Other Embodiments (A)
An application to a base carrier of a hydraulic shovel has been described above. However, the present invention is not limited to this. Of course, the present invention can be applied to other types of construction machine of a type running by crawler tracks, for example, crawler cranes and the like.

(B)
In the above embodiment, the end plate 10 is fixed to the tip of the leg portion 5 by welding. As shown in FIG. 4(a), the end plate 10 has the upper half which is the same as or slightly wider than the width dimension of the upper member 8 and the lower half slightly narrower than the width of the lower member 6 to form the step portions 11. The step portions 11 are provided with the tie bolt holes 13 which penetrate through the lower member 6. However, in the present invention, the end plate 10 does not have to have the width approximate to that of the lower member 6.

Figure 7:
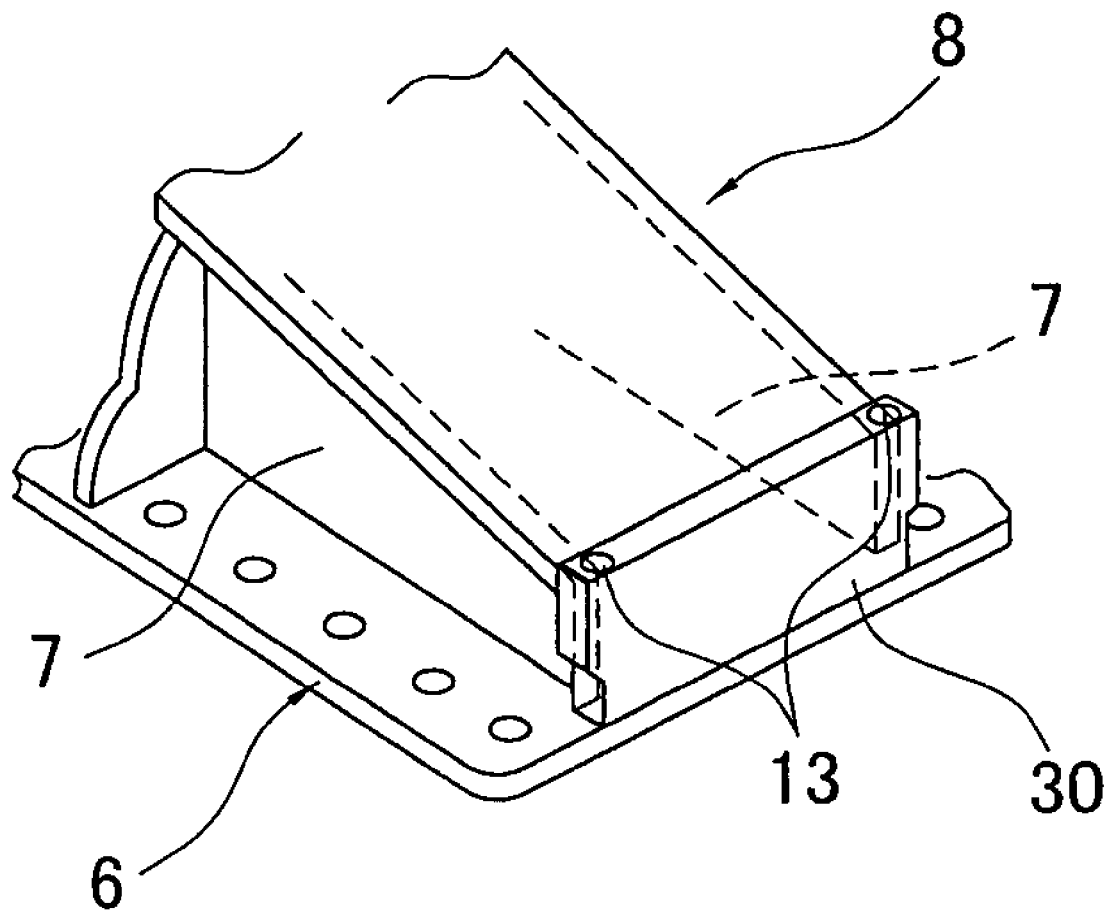
FIG. 7 is a diagram showing an example of a joint portion between a center frame and a crawler frame according to another embodiment of the present invention.

For example, as shown in FIG. 7, even when a width of an end plate 30 is narrower than that of the lower member 6 and is about the same as that of the upper member 8, similar effects as described above that a stress to be applied to a portion of the end plate 30 is reduced can be obtained, and a crawler mounting structure for a construction machine with high durability can be achieved, as long as the tie bolt holes 13 which penetrate the lower member 6 are formed on both ends.

However, attaching the end plate 10 having the width about the same as that of the lower member 6 as in the above embodiment is preferable in terms that the resistance against the stress at the end plate 10 is larger than that of the end plate having a narrow width which is shown in FIG. 7.

INDUSTRIAL APPLICABILITY

The crawler frame mounting structure for a construction machine according to the present invention can solve the problems which may occur at fastened portions between leg portions of a center frame and crawler frames of a base carrier to which a large load may be applied for a long period of time due to a harsh operation. The present invention has effects of simplifying the structure and increasing durability. Thus, it can be widely applied to construction machine of a type running by crawler tracks such as crawler cranes, for example.

What is claimed is:

1. A crawler frame mounting structure for a construction machine, comprising:
 a center frame configured to rotatably support an upper rotating body and including a plurality of leg portions forming box constructions with each of the leg portions having a base plate member, a pair of vertical plate members standing on the base plate members with a predetermined space being interposed therebetween and an upper plate member attached so as to cover upper portions of the vertical plate members welded to each other respectively on a right end and a left end, the center frame being configured and arranged to be fasten to a crawler frame at the leg portions; and a plurality of plates fixed to tips of the leg portions by welding, and configured to be fixed to the crawler frame by tie bolts inserted into tie bolt holes formed on both a right and left end of each plate.

2. The crawler frame mounting structure according to claim 1, wherein
the plates have widths wider than a space between welded positions of the vertical plate members.

3. The crawler frame mounting structure according to claim 1, wherein
the tie bolts holes are formed on both ends of the plates and are formed outside welded positions of the vertical plate members.

4. The crawler frame mounting structure according to claim 1, wherein
the base plate members are interposed between the tie bolts of the plates.

5. The crawler frame mounting structure according to claim 1, wherein
the plates have a pair of ends that are formed as generally R-shaped portions.

6. A crawler frame mounting structure for a construction machine, comprising:
a center frame configured to rotatably support an upper rotating body;

a plurality of fastening portions fastened to the center frame and including front and rear leg portions configured and arranged to fasten a crawler frame on right and left sides, respectively, of the center frame; and a plurality of plates welded to tips of the leg portions and having widths wider than a width between attachment positions of a pair of vertical plates forming the leg portions, and the plates including tie bolt holes formed on both right and left ends.

7. The crawler frame mounting structure according to claim 2, wherein
the tie bolts holes are formed on both ends of the plates and are formed outside the welded positions of the vertical plate members.

8. The crawler frame mounting structure according to claim 2, wherein
the base plate members are interposed between the tie bolts of the plates.

9. The crawler frame mounting structure according to claim 2, wherein
the plates have a pair of ends that are formed as generally R-shaped portions.

10. The crawler frame mounting structure according to claim 3, wherein
the base plate members are interposed between the tie bolts of the plates.

11. The crawler frame mounting structure according to claim 3, wherein
the plates have a pair of ends that are formed as generally R-shaped portions.

12. The crawler frame mounting structure according to claim 4, wherein
the plates have a pair of ends that are formed as generally R-shaped portions.

* * * * *